United States Patent
Choi

[11] Patent Number: 5,920,421
[45] Date of Patent: Jul. 6, 1999

[54] THIN FILM ACTUATED MIRROR ARRAY IN AN OPTICAL PROJECTION SYSTEM AND METHOD FOR MANUFACTURING THE SAME

[75] Inventor: Yoon-Joon Choi, Seoul, Rep. of Korea

[73] Assignee: Daewoo Electronics Co., Ltd., Seoul, Rep. of Korea

[21] Appl. No.: 08/988,450

[22] Filed: Dec. 10, 1997

[51] Int. Cl.[6] ............... G02B 26/08; G02B 7/182; H01L 41/053
[52] U.S. Cl. ............. 359/291; 359/224; 359/295; 359/318; 359/855; 430/321
[58] Field of Search ................ 359/212, 224, 359/290, 291, 295, 318, 850, 855; 430/321

[56] References Cited

U.S. PATENT DOCUMENTS

| | | | |
|---|---|---|---|
| 5,126,836 | 6/1992 | Um | 359/290 |
| 5,469,302 | 11/1995 | Lim | 359/291 |
| 5,604,623 | 2/1997 | Ji | 359/295 |
| 5,760,947 | 6/1998 | Kim et al. | 359/291 |
| 5,805,331 | 9/1998 | Lee | 359/295 |

FOREIGN PATENT DOCUMENTS

| | | |
|---|---|---|
| 0712020 A1 | 5/1996 | European Pat. Off. . |
| 0741310 A1 | 11/1996 | European Pat. Off. . |
| 95/24798 | 9/1995 | WIPO . |

*Primary Examiner*—Georgia Epps
*Assistant Examiner*—Margaret Burke
*Attorney, Agent, or Firm*—Pillsbury Madison & Sutro LLP

[57] ABSTRACT

Thin film AMA in an optical projection system and a method for manufacturing the same are disclosed. The thin film AMA has an active matrix having electrical wiring and a connecting terminal, a first actuator, a second actuator, a supporting element, and a reflecting member. The first actuator and the second actuator are parallely formed and the supporting element is formed in the direction perpendicular to the first actuator and the second actuator. The reflecting member supported by a plurality of posts is tilted by a double displacement, so the quality of a picture projected onto a screen is greatly increased. Also, the first actuator and the second actuator respectively have symmetrical structures centering around the first anchor and the second anchor so that the first actuator and the second actuator have stable structures.

17 Claims, 13 Drawing Sheets

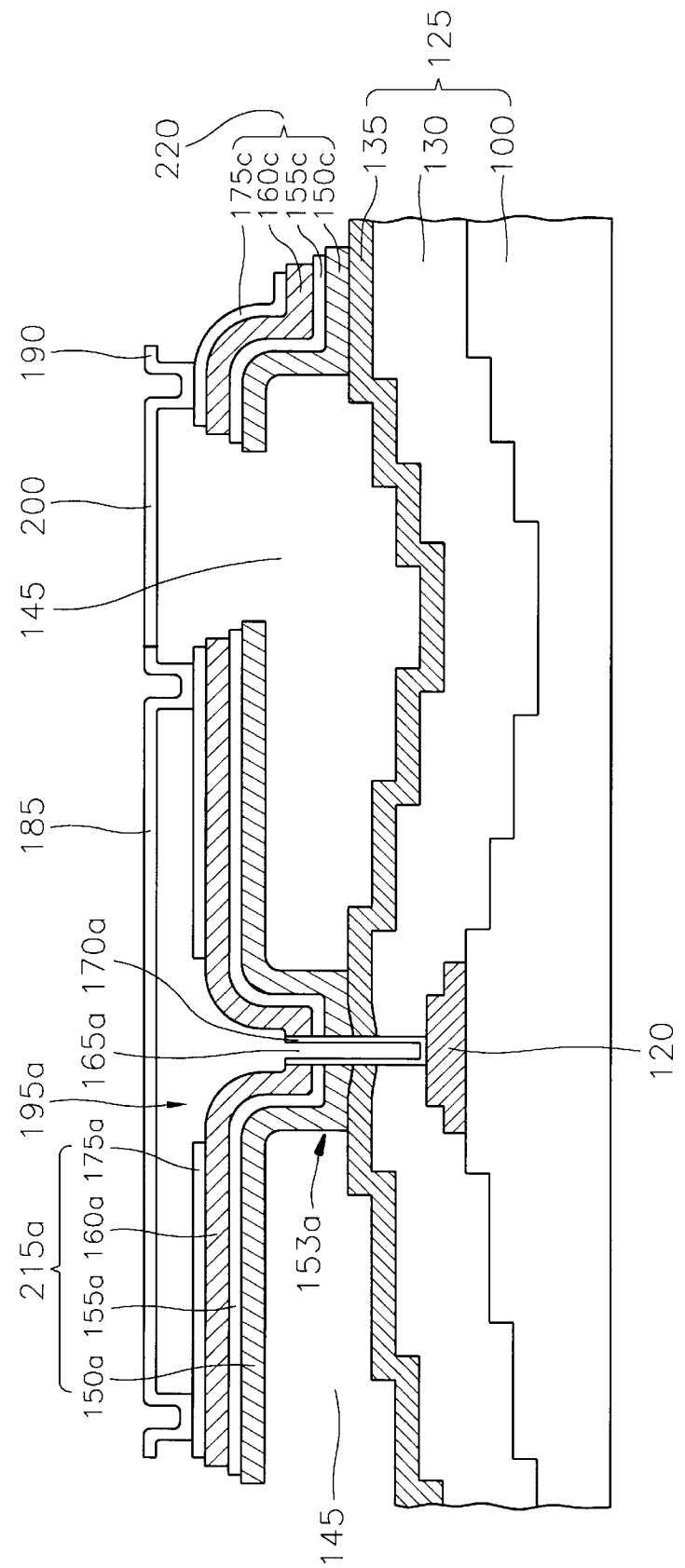

THIN FILM ACTUATED MIRROR ARRAY IN AN OPTICAL PROJECTION SYSTEM AND METHOD FOR MANUFACTURING THE SAME

BACKGROUND OF THE INVENTION

FIELD OF THE INVENTION

The present invention relates to a thin film actuated mirror array in an optical projection system and to a method for manufacturing the same, and more particularly to a thin film actuated mirror array in an optical projection system having actuators each of which has a stable structure, posts formed on the actuators, and a reflecting member formed on the posts in order to enhance light efficiency by increasing the tilting angle of the reflecting member, so the quality and the contrast of a picture projected onto a screen are increased, and to a method for manufacturing the same.

In general, light modulators are divided into two groups according to their optics. One type is a direct light modulator such as a cathode ray tube (CRT) and the other type is a transmissive light modulator such as a liquid crystal display (LCD). The CRT produces superior quality pictures on a screen, but the weight, the volume and the manufacturing cost of the CRT increase according to the magnification of the screen. The LCD has a simple optical structure, so the weight and the volume of the LCD are less than those of the CRT. However, the LCD has a poor light efficiency of under 1 to 2% due to light polarization. Also, there are some problems in the liquid crystal materials of the LCD such as sluggish response and overheating.

Thus, a digital mirror device (DMD) and actuated mirror arrays (AMA) have been developed in order to solve these problems. At the present time, the DMD has a light efficiency of about 5% and the AMA has a light efficiency of above 10%. The AMA enhances the contrast of a picture on a screen, so the picture on the screen is more apparent and brighter. The AMA is not affected by and does not affect the polarization of light and therefore, the AMA is more efficient than the LCD or the DMD.

FIG. 1 shows a schematic diagram of an engine system of a conventional AMA which is disclosed in U.S. Pat. No. 5,126,836 (issued to Gregory Um). Referring to FIG. 1, a ray of incident light from light source 1 passes a first slit 3 and a first lens 5 and is divided into red, green, and blue lights according to the Red Green Blue (RGB) system of color representation. After the divided red, green, and blue lights are respectively reflected by a first mirror 7, a second mirror 9, and a third mirror 11, the reflected lights are respectively incident on AMA devices 13, 15 and 17 corresponding to the mirrors 7, 9 and 11. The AMA devices 13, 15 and 17 tilt the mirrors installed therein, so the incident light is reflected by the mirrors. In this case, the mirrors installed in the AMA devices 13, 15 and 17 are tilted according to the deformation of active layers formed under the mirrors. The light reflected by the AMA devices 13, 15 and 17 pass a second lens 19 and a second slit 21 and form a picture on a screen (not shown) by using projection lens 23.

In most cases, ZnO is used as the active layer. However, lead zirconate titanate (PZT:Pb(Zr,Ti) $O_3$) has a better piezoelectric property than ZnO. PZT is a complete solid solution of lead zirconate (PbZrO$_3$) and lead titanate (PbTiO$_3$). A cubic structure PZT exists in a paraelectric phase at a high temperature. An orthorhombic structure PZT exists in an antiferroelectric phase, a rhombohedral structure PZT exists in a ferroelectric phase, and a tetragonal structure PZT exists in a ferromagnetic phase according to the composition ratio of Zr and Ti at a room temperature. A morphotropic phase boundary (MPB) of the tetragonal phase and the rhombohedral phase exists as a composition which includes Zr:Ti at a ratio of 1:1. PZT has a maximum dielectric property and a maximum piezoelectric property at the MPB. The MPB exists in a wide region in which the tetragonal phase and the rhombohedral phase coexist, but does not exist at a certain composition. Researchers do not agree about the composition of the phase coexistent region of PZT. Various theories such as thermodynamic stability, compositional fluctuation, and internal stress have been suggested as the reason for the phase coexistent region. Nowadays, a PZT thin film is manufactured by various processes such as spin coating method, organometallic chemical vapor deposition (OMCVD) method, and sputtering method.

The AMA is generally divided into a bulk type AMA and a thin film type AMA. The bulk type AMA is disclosed in U.S. Pat. No. 5,469,302 (issued to Dae-Young Lim). In the bulk type AMA, after a ceramic wafer which is composed of a multilayer ceramic inserted into metal electrodes therein is mounted on an active matrix having transistors, a mirror is mounted on the ceramic wafer by means of sawing the ceramic wafer. However, the bulk type AMA has disadvantages in that it demands a very accurate process and design, and the response of an active layer is slow. Therefore, the thin film AMA which is manufactured by using semiconductor technology has been developed.

The thin film AMA is disclosed at U.S. Ser. No. 08/602, 928 entitled "THIN FILM ACTUATED MIRROR ARRAY AND METHOD FOR USE IN AN OPTICAL PROJECTION SYSTEM", which is now pending in USPTO and is subject to an obligation to the assignee of this application.

FIG. 2 shows a cross-sectional view of the thin film AMA. Referring to FIG. 2, the thin film AMA has an active matrix 60 and an actuator 90 formed on the active matrix 60. The active matrix 60 has a substrate 50, M×N (M, N are integers) number of transistors (not shown) which are installed in the substrate 50, M×N (M, N are integers) number of connecting terminals 53 respectively formed on the transistors, a passivation layer 56 formed on the substrate 50, and an etch stop layer 59 formed on the passivation layer 56.

The actuator 90 has a supporting layer 68, a first electrode 71, an active layer 74, a second electrode 77, and a via contact 80. The supporting layer 68 has a first portion attached to the etch stop layer 59 where the connecting terminal 53 is formed thereunder and a second portion parallely formed above the etch stop layer 59. The first portion of the supporting layer is called anchor 68a. An air gap 65 is interposed between the second portion of the supporting layer 68 and the etch stop layer 59. The first electrode 71 is formed on the supporting layer 68, the active layer 74 is formed on the first electrode 71, and the second electrode 77 is formed on the active layer 74. The via contact 80 is formed from a portion of the active layer 74 where the connecting terminal 53 is formed thereunder to the connecting terminal 53. The first electrode 71 and the connecting terminal is connected through the via contact 80.

A manufacturing method of the thin film AMA will be described below. FIGS. 3A to 3D illustrate manufacturing steps of the thin film AMA. In FIGS. 3A to 3D, the same reference numerals are used for the same elements in FIG. 2.

Referring to FIG. 3A, at first, a substrate 50 which includes M×N number of transistors (not shown) are mounted therein and M×N number of connecting terminals 53 respectively formed on the transistors are provided. Subsequently, a passivation layer 56 is formed on the connecting terminal 53 and the substrate 50. The passivation layer 56 is formed by using a phosphor-silicate glass (PSG) and by a chemical vapor deposition (CVD) method so that the passivation layer 56 has a thickness of between 0.1 $\mu$m and 2.0 $\mu$m. The passivation layer 56 protects the substrate 50 having the transistors during subsequent manufacturing steps.

An active matrix 60 is completed after an etch stop layer 59 is on the passivation layer 59. The active matrix 60 includes the substrate 50, the connecting terminal 53, the passivation layer 56, and the etch stop layer 59. The etch stop layer 59 is formed by using a nitride and by a chemical vapor deposition method so that the etch stop layer 59 has a thickness of between 1000 Å and 2000 Å. The etch stop layer 59 prevents the passivation layer 56 and the substrate 50 from etching during subsequent etching steps.

A sacrificial layer 62 is formed on the etch stop layer 59. The sacrificial layer 62 is formed by using a phosphor-silicate glass and by a chemical vapor deposition method so that the sacrificial layer 62 has a thickness of between 1.0 $\mu$m and 2.0 $\mu$m. In this case, the flatness of surface of the sacrificial layer 62 is poor because the sacrificial layer 62 covers over the substrate 50 having the transistors. Thus, the surface of the sacrificial layer 62 is planarized by using a spin on glass (SOG) or by a chemical mechanical polishing. Subsequently, the sacrificial layer 55 is patterned in order to expose a portion of the etch stop layer 59 where the connecting terminal 53 is formed thereunder. An anchor 68a will be formed at the exposed portion of the etch stop layer 59.

Referring to FIG. 3B, a first layer 67 is formed on the exposed portion of the etch stop layer 59 and on the sacrificial layer 62. The first layer 67 is formed by using a nitride and by a sputtering method or CVD method so that the first layer 67 has a thickness of between 0.1 $\mu$m and 2.0 $\mu$m. A first electrode layer 70 is formed on the first layer 67 by using a metal such as platinum or a tantalum and by a sputtering method or a CVD method so that the first electrode layer 70 has a thickness of between 0.1 $\mu$m and 1.0 $\mu$m. Nextly, the first electrode layer 70 is iso-cutted so as to separately apply a first signal (picture signal) to each of pixels including the first electrode layer 70.

A second layer 73 is formed on the first electrode layer 70 by using a piezoelectric material such as a lead zirconate titanate (PZT) or an electrostrictive material such as a lead magnesium niobate (PMN). The second layer 73 is formed by a solgel method, a sputtering method, or a CVD method so that the second layer 73 has a thickness of between 0.1 $\mu$m and 1.0 $\mu$m. A second electrode layer 76 is formed on the second layer 73 by using a metal such as aluminum or silver and by a sputtering method or a CVD method so that the second electrode layer 73 has a thickness of between 0.1 $\mu$m and 1.0 $\mu$m.

Referring to FIG. 3C, the second electrode layer 76, the second layer 73, and the first electrode layer 70 are respectively patterned so as to from a second electrode 77, an active layer 74, and a first electrode 71. Thus, M×N number of pixels having predetermined shapes are formed. At that time, a portion of the active layer 74 is exposed by etching a portion of the second electrode 77 where the connecting terminal 53 is formed thereunder. Subsequently, a via hole 79 is formed from the exposed portion of the active layer 74 to the connecting terminal 53 after portions of the active layer 74, the first electrode 71, the first layer 67, the etch stop layer 59, and the passivation layer 56 are etched.

Referring to FIG. 3D, a via contact 80 is formed in the via hole 79 by filling the via hole 79 with an electrically conductive material, for example, tungsten. The via contact 80 is formed by a sputtering method or a CVD method. The via contact 80 electrically connects the connecting terminal 53 to the first electrode 71. The first signal transmitted from outside is applied to the first electrode 71 through the transistor, the connecting terminal 53, and the via contact 80. At the same time, a second signal (bias signal) transmitted from outside is applied to the second electrode 77 through a common line (not shown), so an electric field is generated between the second electrode 77 and the first electrode 71. The active layer 74 formed between the second electrode 77 and the first electrode 71 is deformed by the electric field. The active layer 74 is deformed in perpendicular direction to the electric field, so the actuator 90 including the active layer 74 is actuated upward by a predetermined angle. The second electrode 77 is also tilted upward, and the second electrode 77 reflects the incident light from the light source (not shown) by a predetermined angle.

Subsequently, the first layer 69 is patterned to form a supporting layer 68 which supports the actuator 90. A portion of the supporting layer 68 is attached to the etch stop layer 59 where the connecting terminal 53 is formed thereunder. The attached portion of the supporting layer 68 is called an anchor 68a. After the sacrificial layer 62 is removed by using a hydrogen fluoride vapor, pixels are rinsed and dried in order to complete the thin film AMA.

However, in the above-described thin film AMA, the amount of the light reflected by the mirror is smaller than the amount of the light incidented to the thin film AMA when considering the area of the thin film AMA, because a supporting portion of the second electrode which functions as a mirror is larger than a reflecting portion of it. That is, because the supporting portion of the mirror which supports the reflecting portion during a tilting of the mirror is larger than the reflecting portion of the mirror which actually reflects the light incident on the thin film AMA, the light efficiency decreases with respect to the actual area of the thin film AMA so that the quality of picture projected onto the screen by the thin film AMA decreases. In addition, a high voltage is applied between the first electrode and the second electrode in order to increase the tilting angle of the actuator, so the piezoelectric property of the active layer is decreased or the fatigue of the active layer is hastened. Furthermore, the actuator may be bowed due to the stress generated in the thin films composed of actuator, so the stability of the actuator is decreased. Hence, the durability of the actuator and the quality of a picture projected onto the screen by the thin film AMA are also decreased.

SUMMARY OF THE INVENTION

Accordingly, considering the conventional problems as described above, it is a first object of the present invention to provide a thin film actuated mirror array in an optical projection system having actuators each of which has a stable structure, posts formed on the actuators, and a reflecting member formed on the posts in order to enhance light efficiency by increasing the tilting angle of the mirror, so the quality and the contrast of a picture projected onto a screen are increased.

Also, it is a second object of the present invention to provide a method for manufacturing the above thin film actuated mirror array in an optical projection system.

To accomplish the above first object, there is provided in the present invention a thin film actuated mirror array in an optical projection system having an active matrix, a first actuator, a second actuator, a supporting element, and a reflecting member. Preferably, the first actuator and the second actuator are parallely formed, and the supporting element is formed in perpendicular direction with respect to the first actuator and the second actuator.

The active matrix has a substrate including an electrical wiring and a connecting terminal for receiving a first signal from outside and transmitting the first signal. Preferably, the active matrix has a passivation layer formed on the substrate and an etch stop layer formed on the passivation layer.

The first actuator has a first supporting layer, a first bottom electrode, a first active layer, and a first top electrode. The first supporting layer has a central portion attached to a first portion of the active matrix where the connecting terminal is formed and lateral portions parallely formed above the active matrix. The first bottom electrode is formed on the first supporting layer and receives the first signal. The first top electrode which corresponds to the first bottom electrode receives a second signal and generates a first electric field between the first top electrode and the first bottom electrode. The first active layer is formed between the first top electrode and the first bottom electrode and is deformed by the first electric field.

The second actuator has a second supporting layer, a second bottom electrode, a second active layer, and a second top electrode. The second supporting layer has a central portion attached to a second portion of the active matrix where the connecting terminal is formed and lateral portions parallely formed above the active matrix. The second bottom electrode is formed on the second supporting layer and receives the first signal. The second top electrode which corresponds to the second bottom electrode receives the second signal and generates a second electric field between the second top electrode and the second bottom electrode. The second active layer is formed between the second top electrode and the second bottom electrode and is deformed by the second electric field. The first top electrode has a first part and a second part respectively formed on the lateral portions of the first active layer. The second top electrode has a first part and a second part respectively formed on the lateral portions of the second active layer.

Preferably, the first actuator has a first post including lateral portions respectively attached to the first top electrode and a central portion formed above the first top electrode, and the second actuator has a second post including lateral portions respectively attached to the second top electrode and a central portion formed above the second top electrode. The first post and the second post are extended toward each other, so the first post and the second post form an H-shape. The first actuator further has a first via contact for transmitting the first signal from the connecting terminal to the first bottom electrode. The first via contact is formed in a first via hole which is formed from a central portion of the first active layer to the connecting terminal through the first bottom electrode and the first supporting layer. The second actuator further has a second via contact for transmitting the first signal from the connecting terminal to the second bottom electrode. The second via contact is formed in a second via hole which is formed from a central portion of the second active layer to the connecting terminal through the second bottom electrode and the second supporting layer.

The supporting element has a third supporting layer formed on a third portion of the active matrix, a third bottom electrode formed on the third supporting layer, a third active layer formed on the third bottom electrode, a third top electrode formed on the third active layer, and a third post formed on the third top electrode.

The reflecting member is formed from the extended portions of the first post and the second post to the third post. The reflecting member has a rectangular shape.

In order to accomplish the above second object, there is provided in the present invention a method for manufacturing a thin film actuated mirror array comprising the steps of:

providing an active matrix having electrical wiring and a connecting terminal for receiving the first signal from outside and transmitting the first signal;

forming a first sacrificial layer on the active matrix;

patterning the first sacrificial layer to expose a first portion and a second portion of the active matrix where the connecting terminal is formed, and to expose a third portion of the active matrix in perpendicular direction to the first exposed portion and the second exposed portion;

forming a first layer, a bottom electrode layer, a second layer, and a top electrode layer on the exposed portions of the active matrix and on the first sacrificial layer;

forming a first actuator and a second actuator in parallel by patterning the top electrode layer to form a first top electrode and a second top electrode for respectively receiving the second signal and respectively generating a first electric field and a second electric field, by patterning the second layer to form a first active layer and a second active layer respectively deformed by the first electric field and the second electric field, by patterning the bottom electrode layer to form a first bottom electrode and a second bottom electrode for respectively receiving the first signal, and by patterning the first layer to form a first supporting layer having a central portion attached to the first exposed portion of the active matrix and lateral portions formed on the first sacrificial layer, and to form a second supporting layer having a central portion attached to the second exposed portion of the active matrix and lateral portions formed on the first sacrificial layer;

forming a supporting element by patterning the top electrode layer to form a third top electrode, by patterning the second layer to form a third active layer, by patterning the bottom electrode layer to form a third bottom electrode, and by patterning the first layer to form a third supporting layer attached to the third exposed portion of the active matrix;

forming a second sacrificial layer on the first actuator, on the second actuator, and on the supporting element; and forming a reflecting member for reflecting a light on the first actuator, on the second actuator, and on the supporting element.

The step of forming the first actuator further includes forming a first via hole from a central portion of the first active layer to the connecting terminal and forming a first via contact for connecting the first bottom electrode and the connecting terminal in the first via hole. The step of forming the second actuator further includes forming a second via hole from a central portion of the second active layer to the connecting terminal and forming a second via contact for connecting the second bottom electrode and the connecting terminal in the second via hole.

Preferably, the step of forming the reflecting means further comprises, i) patterning the second sacrificial layer to expose lateral portions of the first top electrode, lateral portions of the second top electrode, and a portion of the third top electrode, ii) forming a reflective metal such as silver, aluminum, nickel, or platinum on the exposed portions of the first top electrode, the second top electrode, and the third top electrode, and on the second sacrificial layer, and iii) forming a first post on the first top electrode, forming a second post on the second top electrode, forming a third post on the third top electrode, and forming the reflecting member by patterning the reflective metal.

The step of forming the second sacrificial layer is performed by using a spin on polymer or photoresist.

Preferably, the step of forming the reflecting member further comprises removing the second sacrificial layer by using oxygen plasma and removing the first sacrificial layer by using a hydrogen fluoride vapor.

In the thin film AMA according to the present invention, the first signal is applied to the first bottom electrode from outside through the electrical wiring, the connecting terminal, and the first via contact. Also, the first signal is applied to the second bottom electrode from outside through the electrical wiring, the connecting terminal, and the second via contact. At the same time, the second signal is applied to the first top electrode and to the second top electrode from outside through a common line. As a result, the first electric field is generated between the first top electrode and the first bottom electrode and the second electric field is generated between the second top electrode and the second bottom electrode. The first active layer formed between the first top electrode and the first bottom electrode is deformed by the first electric field and the second active layer formed between the second top electrode and the second bottom electrode is deformed by the second electric field. The first active layer and the second active layer are respectively deformed in the direction perpendicular to the first electric field and the second electric field. The first actuator having the first active layer is actuated in the opponent direction to the direction in which the first supporting layer is positioned and the second actuator having the second active layer is actuated in the opponent direction to the position where the second supporting layer is positioned. The lateral portions of the first actuator are respectively actuated upward centering around the first anchor. When the lateral portions of the first actuator are actuated, the first post formed on the first actuator is also bent upward by means of a metal tension strip interaction between the first actuator and the first post. In this case, when the displacement of the first actuator is δ, the first post has the same displacement as that of the first actuator. That is, the displacement of the first post is δ. Also, the lateral portions of the second actuator are respectively actuated upward centering around the second anchor. When the lateral portions of the second actuator are actuated, the second post formed on the second actuator is also bent upward by means of the metal tension strip interaction between the second actuator and the second post. When the displacement of the second actuator is δ, the second post has the same displacement as that of the second actuator. Therefore, the sum of the displacements of the actuators and the posts is 2δ. The reflecting member which is supported by the first post and the second post is tilted by a displacement of 2δ. Hence, the reflecting member reflects the light onto a screen, so the picture is formed on the screen. Therefore, in the thin film actuated mirror array in an optical projection system according to the present invention, the thin film AMA has a first actuator, a second actuator, a supporting element, and a reflecting member. The first actuator and the second actuator are respectively actuated by a predetermined displacement. A first post, a second post, and a third post are respectively formed on the first actuator, the second actuator, and the third actuator. The first post and the second post are respectively bent by a predetermined displacement by means of the metal tension strip interaction between the posts and the actuators. The reflecting member supported by the first post and the second post is tilted by a double displacement, so the quality of a picture projected onto a screen is greatly increased. Also, the first actuator and the second actuator respectively have the symmetrical structures centering around the first anchor and the second anchor so that the first actuator and the second actuator have stable structures. In addition, the reflecting member is supported by the first post, the second post, and the third post so as to increase the flatness of the reflecting member.

BRIEF DESCRIPTION OF THE DRAWINGS

The above objects and advantages of the present invention will become more apparent by describing in detail preferred embodiments thereof with reference to the attached drawings, in which:

FIG. 6 is a cross-sectional view taken along line $A_1$–$A_2$ of FIG. 5;

DETAILED DESCRIPTION OF THE INVENTION

Hereinafter, the preferred embodiment of the present invention will be explained in more detail with reference to the accompanying drawings.

Figure 1:
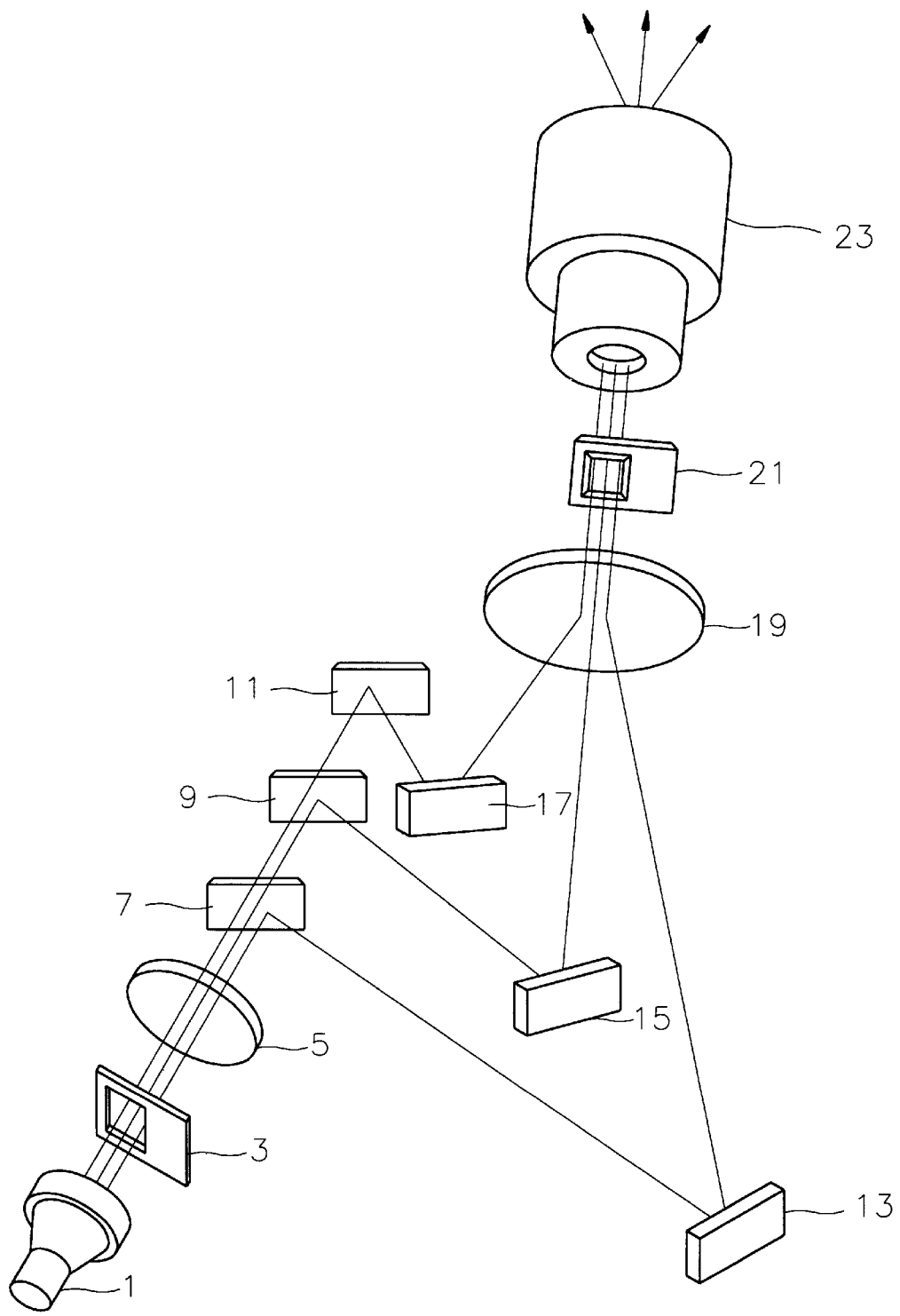
FIG. 1 is a schematic view for showing an engine system of a conventional actuated mirror array.
Figure 2:
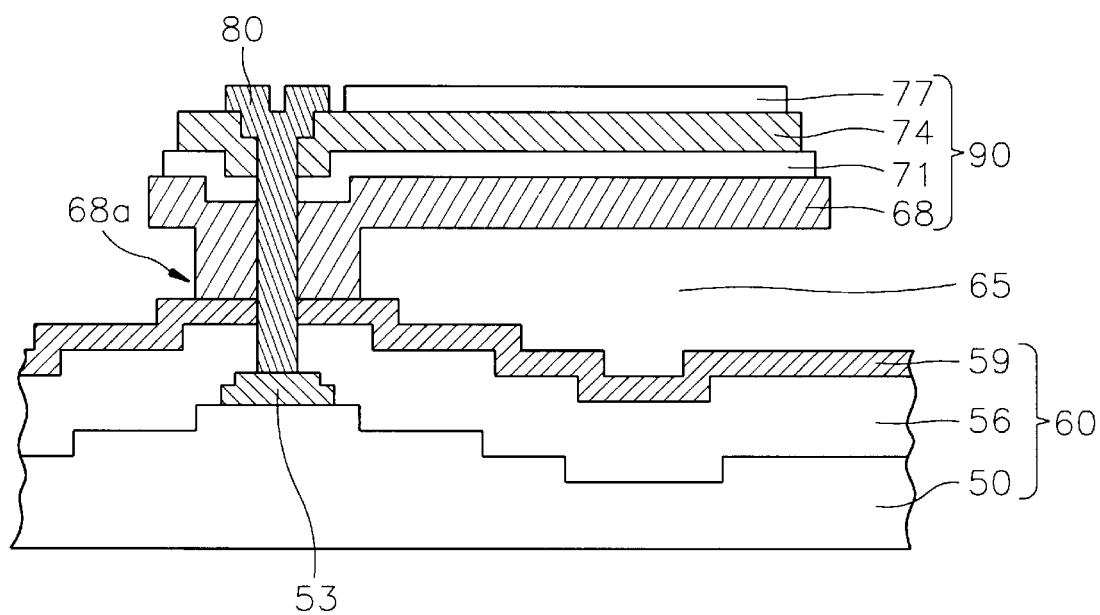
FIG. 2 is a cross-sectional view for showing a thin film actuated mirror array in an optical projection system disclosed in a prior application of the assignee of this application.
Figure 3A:
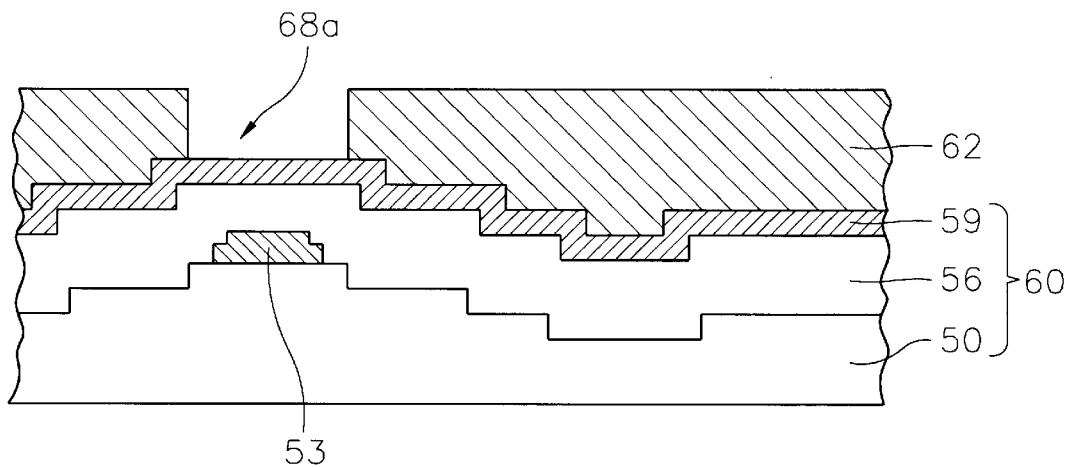
FIGS. 3A to 3D illustrate manufacturing steps of the thin film actuated mirror array in the optical projection system in FIG. 2.
Figure 3B:
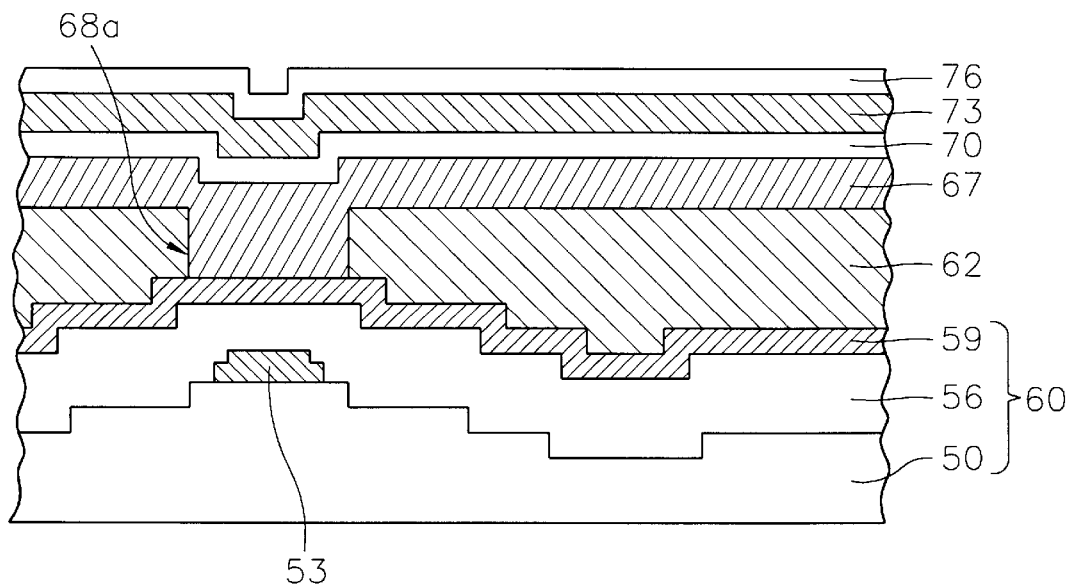
Figure 3C:
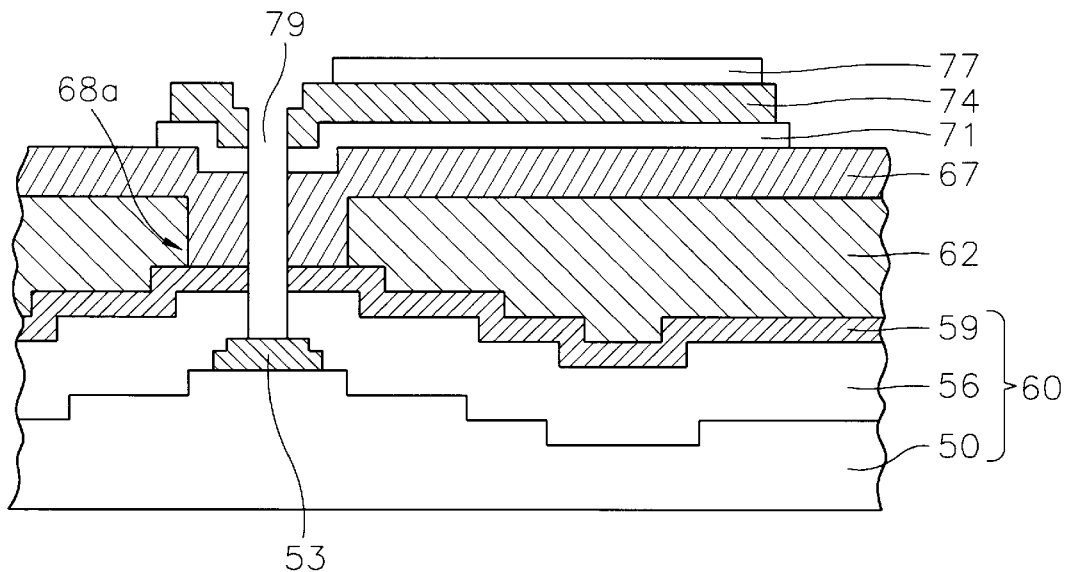
Figure 3D:
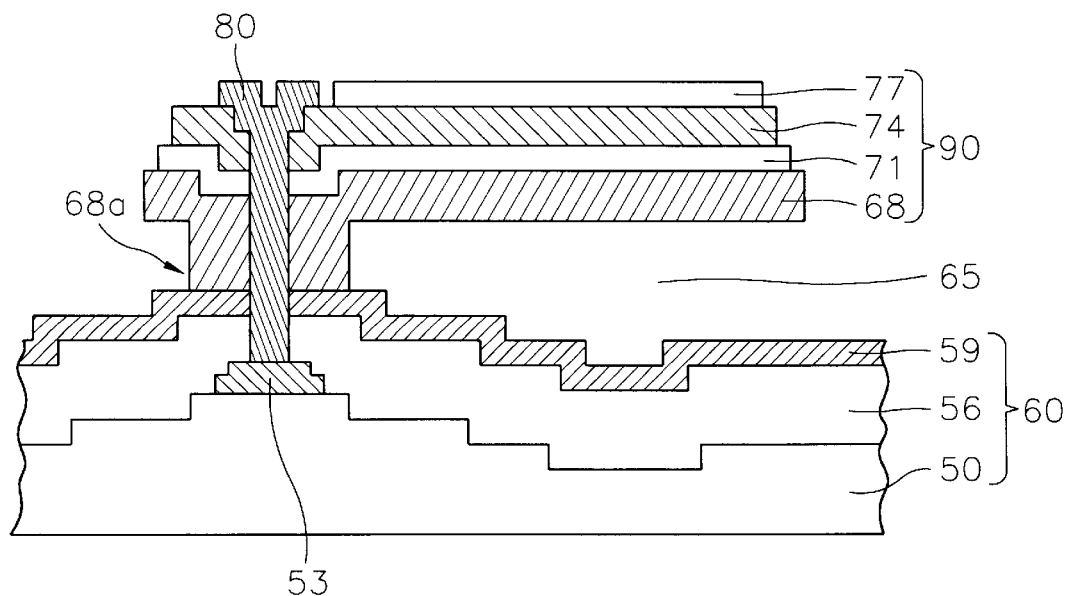
Figure 4:
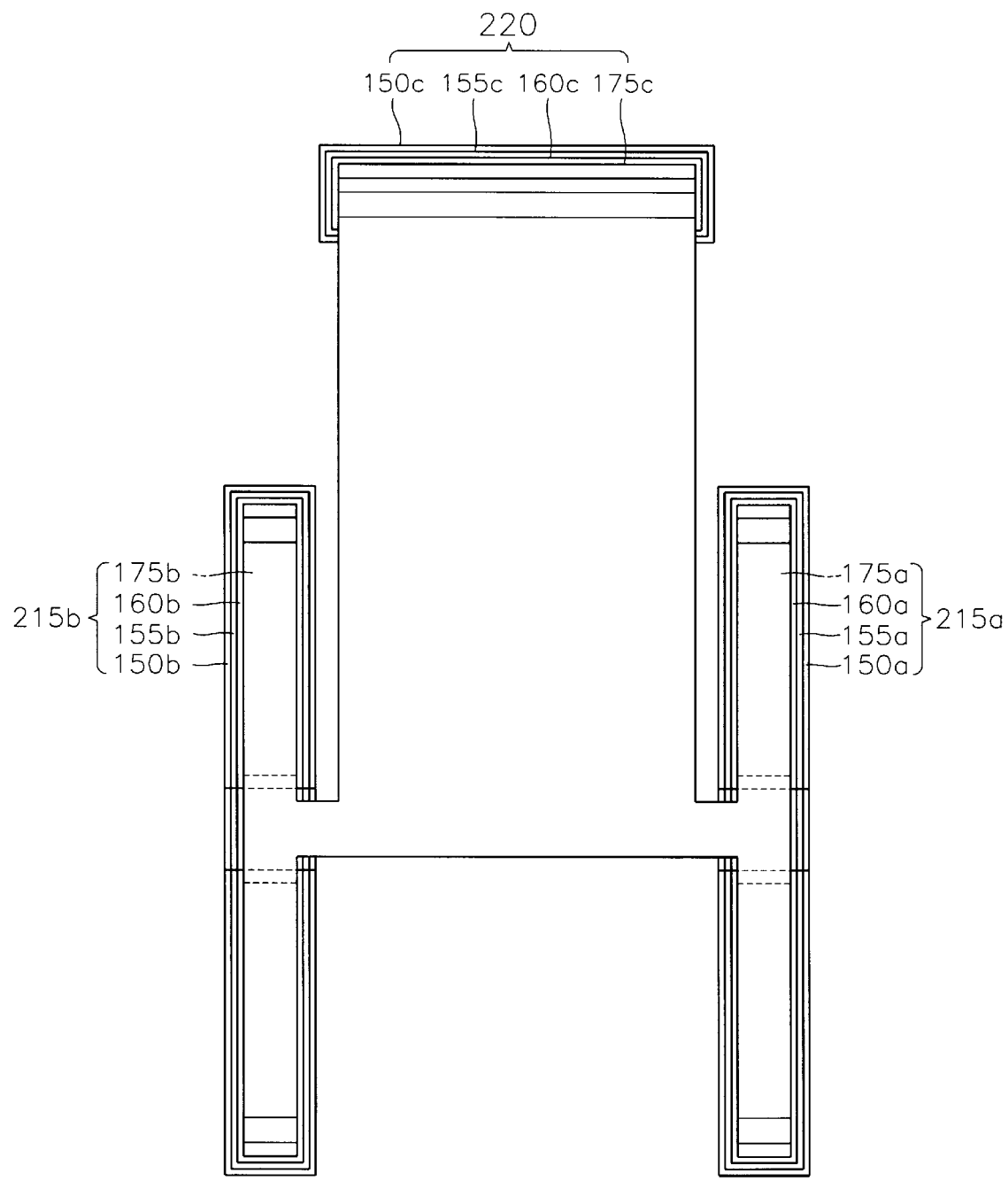
FIG. 4 is a plan view for showing a thin film actuated mirror array in an optical projection system according the present invention.
Figure 5:
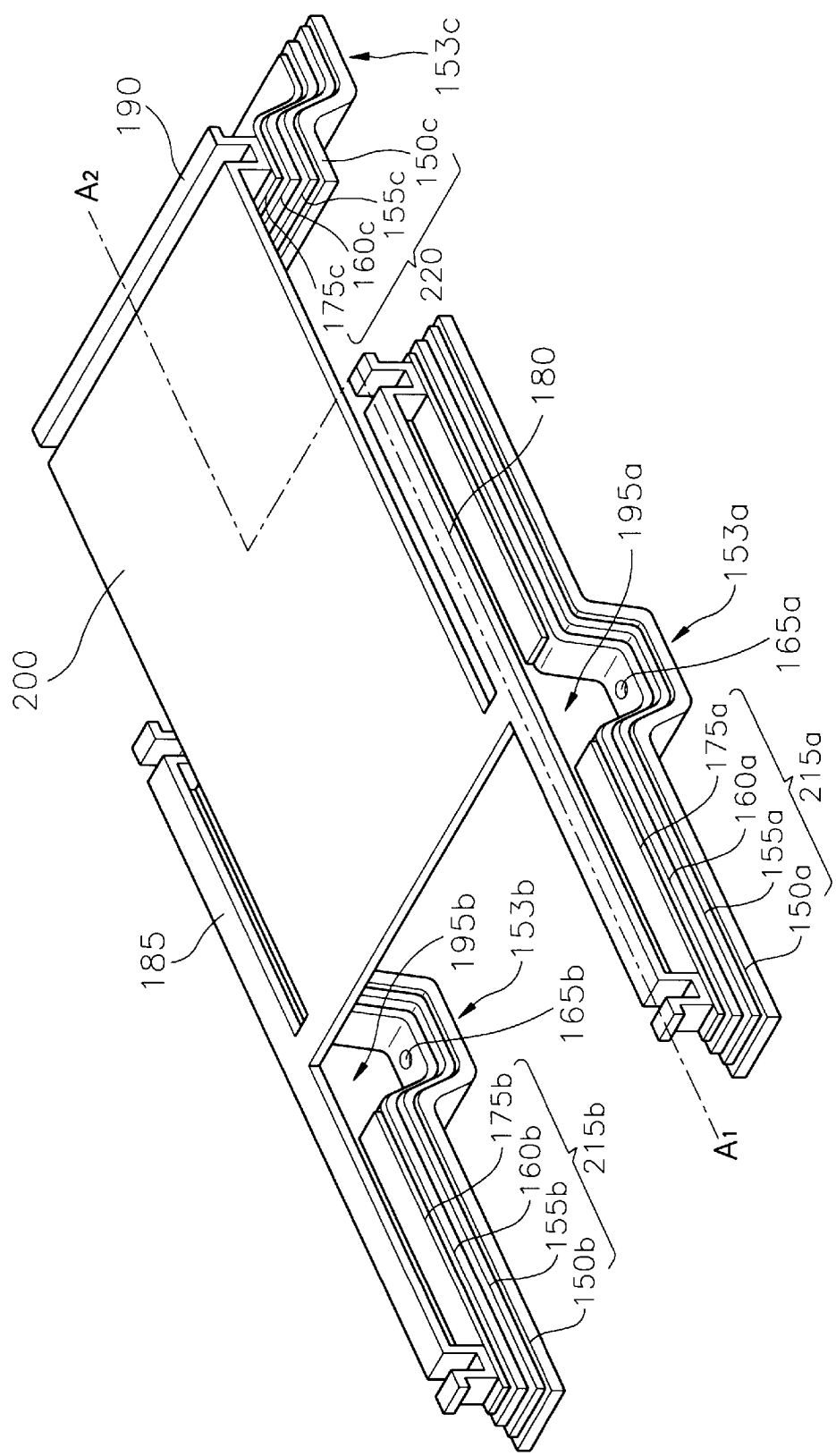
FIG. 5 is a perspective view for showing the thin film actuated mirror array in the optical projection system in FIG. 4.

FIG. 4 is a plan view for showing a thin film actuated mirror array in an optical projection system according to the present invention, FIG. 5 is a projection view for showing the thin film actuated mirror array the optical projection system in FIG. 4, and FIG. 6 is a cross-sectional view taken along line $A_1$–$A_2$ of FIG. 5.

Referring to FIGS. 4 to 6, the thin film AMA in an optical projection system according to the present invention has an active matrix 125, a first actuator 215a, a second actuator 215b, a supporting element 220, and a reflecting member 200.

Referring to FIG. 6, the active matrix 125 has a substrate 100 having electrical wiring (not shown), a connecting terminal 120 formed on the electrical wiring, a passivation layer 130 formed on the substrate 100 and on the connecting terminal 120, and an etch stop layer 135 formed on the passivation layer 130. Preferably, the electrical wiring has M×N (M, N are integers) MOS transistors and the connecting terminal 120 has a drain pad prolonged from a drain region of the MOS transistor in order to transmit a first signal (picture current signal).

Referring to FIGS. 5 to 6, the first actuator 215a has a first supporting layer 150a, a first bottom electrode 155a, a first active layer 160a, a first top electrode 175a, and a first via contact 170a. The bottom of the central portion of the first supporting layer 150a is attached to a first portion of the etch stop layer 135 having the connecting terminal 120 thereunder. The central portion of the first supporting layer 150a is called a first anchor 153a. The lateral portions of the first supporting layer 150a is parallely formed above the etch stop layer 135. A first air gap 145 is interposed between the lateral portions of the first supporting layer 150a and the etch stop layer 135. The first bottom electrode 155a is formed on the first supporting layer 150a and the first active layer 160a is formed on the first bottom electrode 155a. The first top electrode 175a is divided into two parts respectively formed on lateral portions of the first active layer 160a. The first via contact 170a is formed in a first via hole 165a which is formed from a central portion of the first active layer 160a to the connecting terminal 120 through the first bottom electrode 155a, the first supporting layer 150a (that is, the first anchor 153a), the etch stop layer 135, and the passivation layer 130. Thus, the first actuator 215a has a U-shape wherein the central portion of the first actuator 215a is attached to the first portion of the etch stop layer 135 and lateral portions of the first actuator 215a are parallely prolonged above the etch stop layer 135. The first via hole 165a and the first via contact 170a are formed in the central portion of the first actuator 215a.

The second actuator 215b is correspondingly formed in parallel direction to the first actuator 215a. The second actuator 215b has a second supporting layer 150b, a second bottom electrode 155b, a second active layer 160b, a second top electrode 175b, and a second via contact 170b. The bottom of the central portion of the second supporting layer 150b is attached to a second portion of the etch stop layer 135 having the connecting terminal 120 thereunder. The central portion of the second supporting layer 150b is called a second anchor 153b. The lateral portions of the second supporting layer 150b is parallely formed above the etch stop layer 135. The first air gap 145 is interposed between the lateral portions of the second supporting layer 150b and the etch stop layer 135. The second bottom electrode 155b is formed on the second supporting layer 150b and the second active layer 160b is formed on the second bottom electrode 155b. The second top electrode 175b is divided into two parts respectively formed on lateral portions of the second active layer 160b. The second via contact 170b is formed in a second via hole 165b which is formed from a central portion of the second active layer 160b to the connecting terminal 120 through the second bottom electrode 155b, the second supporting layer 150a (that is, the second anchor 153b), the etch stop layer 135, and the passivation layer 130. Thus, the second actuator 215b has a U-shape wherein the central portion of the second actuator 215b is attached to the second portion of the etch stop layer 135 and lateral portions of the second actuator 215b are parallely prolonged above the etch stop layer 135. The second via hole 165b and the second via contact 170b are formed in the central portion of the second actuator 215b.

The supporting element 220 is formed in perpendicular direction about the first actuator 215a and the second actuator 215b. The supporting element 220 has a third supporting layer 150c, a third bottom electrode 155c, a third active layer 160c, and a third top electrode 175c. A first portion of the third supporting layer 150c is attached to a third portion of the etch stop layer 135. A second portion of the third supporting layer 150c is parallely formed above the etch stop layer 135. The first air gap 145 is interposed between the second portion of the third supporting layer 150c and the etch stop layer 135. The supporting element 220 has the same height as those of the first actuator 215a and the second actuator 215b so as to horizontally support the reflecting member 200. The first actuator 215a and the second actuator 215b are parallely formed on the etch stop layer 135, and the supporting element 220 is perpendicularly formed with respect to the first actuator 215a and the second actuator 215b, so the plan view of the first actuator 215a, the second actuator 215b, and the supporting element 220 has a U-shape.

Referring to FIG. 5, a first post 180 is formed on the first top electrode 175a, a second post 185 is formed on the second top electrode 175b, and a third post 190 is formed on the third top electrode 175c. The lateral portions of the first post 180 are respectively attached to the lateral portions of the first top electrode 175a, and the central portion of the first post 180 is protruded above the first top electrode 175a. A second air gap 195a is interposed between the central portion of the first post 180 and the first top electrode 175a. Also, the lateral portions of the second post 185 are respectively attached to the lateral portions of the second top electrode 175b, and the central portion of the second post 185 is protruded above the second top electrode 175b. A third air gap 195b is interposed between the central portion of the second post 185 and the second top electrode 175b. The central portions of the first post 180 and the second post 185 are extended toward each other, so the first post 180 and the second post 185 together form an H-shape. Bottoms of lateral portions of the first post 180 and the second post 185, and bottoms of the third post 190 respectively have U-shapes. The first post 180, the second post 185, and the third post 190 support the reflecting member 200.

The reflecting member 200 for reflecting incident light is formed among the first post 180, the second post 185, and the third post 190. A first portion of the reflecting member 200 is connected to the extended portions of the first post 180 and the second post 185. Also, second portion of the reflecting member 200 is connected to the second portion of the third post 190, so reflecting member 200 has a rectangular shape.

A method for manufacturing the thin film AMA in an optical projection system according to the present invention will be described as follows.

FIGS. 7A to 7E illustrate manufacturing steps of the thin film AMA according to the present invention. In FIGS. 7A to 7E, the same reference numerals are used for the same elements as those in FIGS. 5 and 6.

Figure 7A:
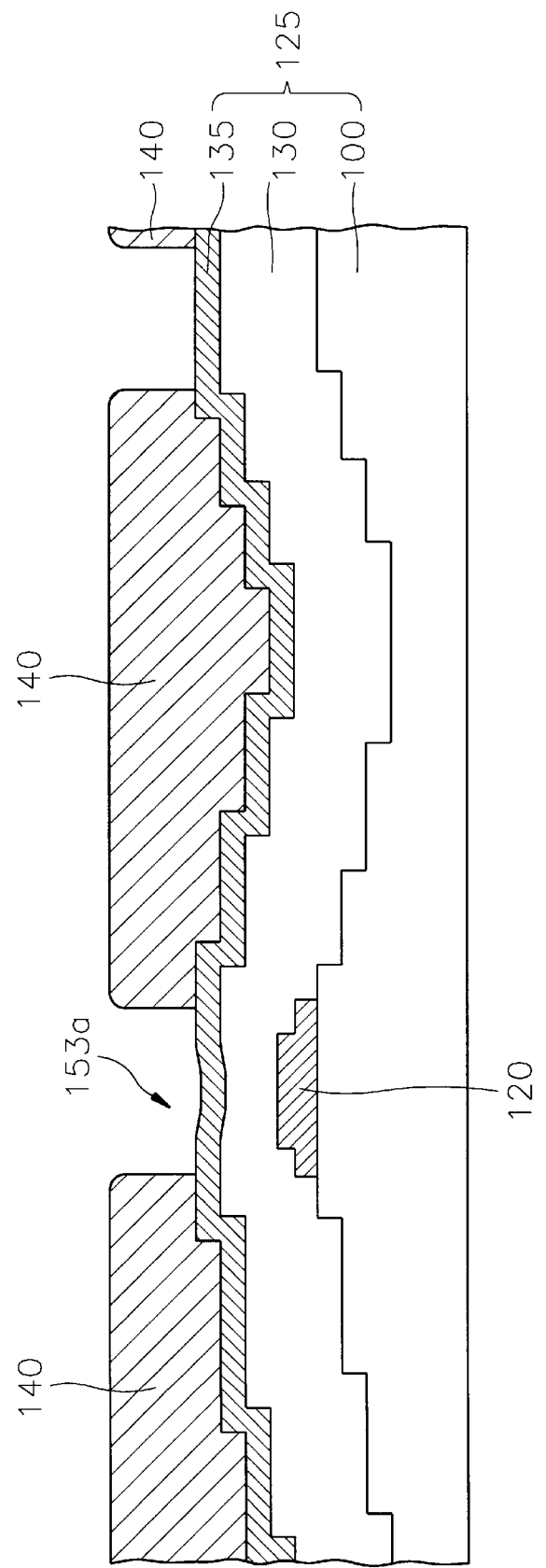
FIGS. 7A to 7E illustrate manufacturing steps of the thin film actuated mirror array in an optical projection system according to the present invention.

Referring to FIG. 7A, the substrate 100 having the electrical wiring (not shown) and the connecting terminal 120 is provided. The electrical wiring and the connecting terminal 120 receive a first signal from outside, that is a picture current signal, and transmit the first signal to the first bottom electrode 155a and to the second bottom electrode 155b. Preferably, the substrate 100 is a silicon wafer, the electrical wiring has M×N (M, N are integers) MOS transistors for switching operation, and the connecting terminal 120 includes drain pads prolonged from drain regions of the MOS transistors. The connecting terminal 120 is formed by using a metal such as titanium (Ti) or tungsten (W).

The passivation layer 130 is formed on the substrate 100 by using a phosphor-silicate glass (PSG) and by a chemical vapor deposition (CVD) method so that the passivation layer 130 has a thickness of between about 0.1 μm and 2.0 μm. The passivation layer 130 protects the substrate 100 having the electrical wiring and the connecting terminal 120 during subsequent manufacturing steps.

The etch stop layer 135 is formed on the passivation layer 130, so the active matrix 125 is completed. The etch stop layer 135 is formed by using a nitride so that the etch stop layer 135 has a thickness of between about 1000 Å and 2000 Å. The etch stop layer 135 is formed by a low pressure chemical vapor deposition (LPCVD) method. The etch stop layer 135 prevents the passivation layer 130 and the substrate 100 from etching during subsequent etching steps.

Figure 7B:
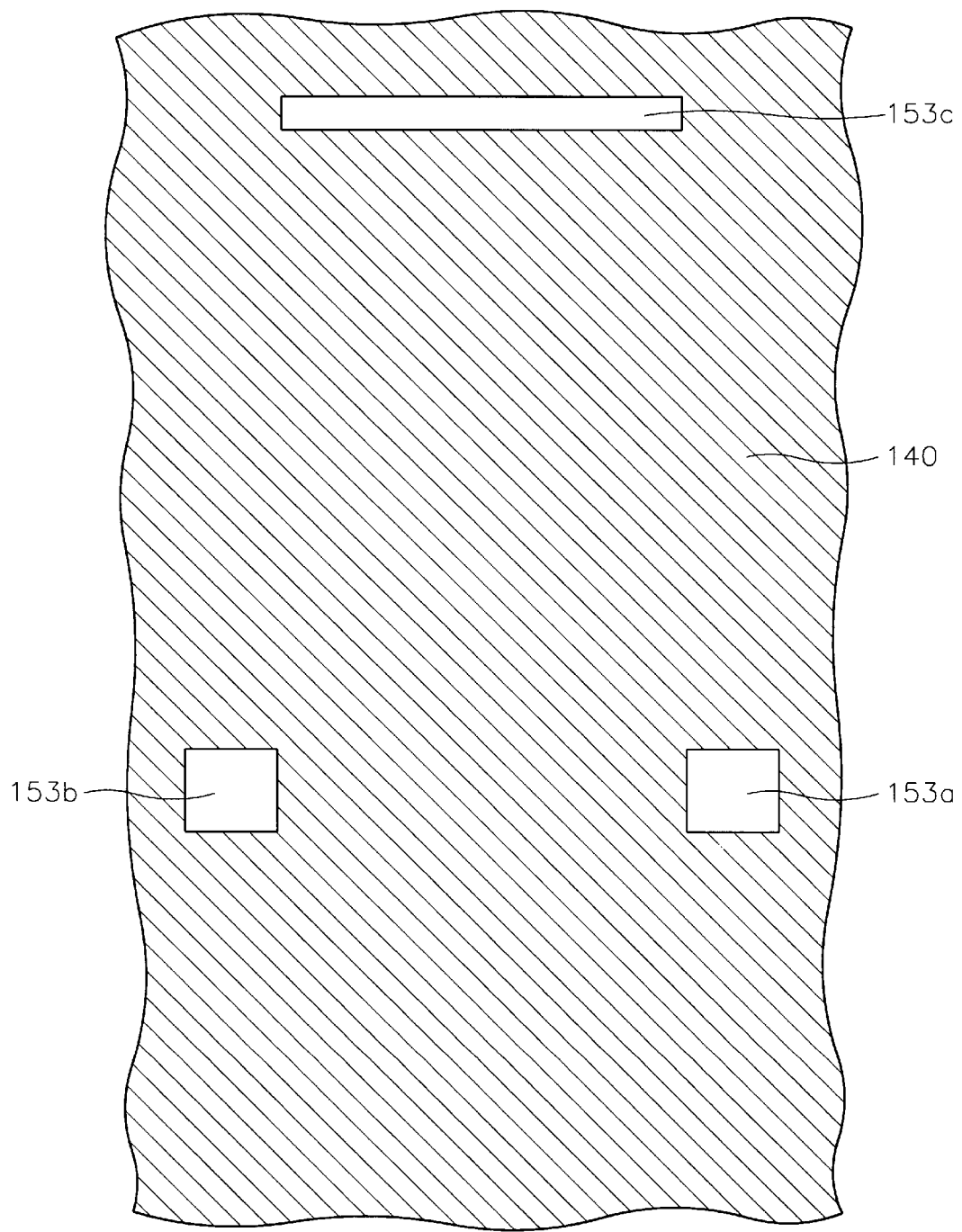

A first sacrificial layer 140 is formed on the etch stop layer 135 by using a PSG. The first sacrificial layer 140 is formed by an atmospheric pressure CVD (APCVD) method so that the first sacrificial layer 140 has a thickness of between about 2.0 μm and 3.0 μm. In this case, the degree of flatness of the first sacrificial layer 140 is poor because the first sacrificial layer 140 covers the top of active matrix 125 having the substrate 100 which includes the electrical wiring and the connecting terminal 120. Therefore, the surface of the first sacrificial layer 140 is planarized by using a spin on glass (SOG) or by a chemical mechanical polishing (CMP) method so that the first sacrificial layer 140 has a thickness of about 1.1 μm. Subsequently, a first portion and a second portion of the first sacrificial layer 140 having the connecting terminal 120 formed thereunder and a third portion of the first sacrificial layer 140 are etched in order to expose a first portion and a second portion of the etch stop layer 135 having the connecting terminal 120 formed thereunder and to expose a third portion of the etch stop layer 135. FIG. 7B is a plan view for showing the state in which the first sacrificial layer 140 is patterned. In FIG. 7B, the third exposed portion of the etch stop layer 135 is perpendicularly formed with respect to the first exposed portion and the second exposed portion of the etch stop layer 135. The first anchor 153a, the second anchor 153b, and a third anchor 153c are respectively formed on the first exposed portion, the second exposed portion, and the third exposed portion of the etch stop layer 135. The first anchor 153a, the second anchor 153b, and the third anchor 153c respectively support the first actuator 215a, the second actuator 215b, and the supporting element 220. The first anchor 153a and the second anchor 153b are parallely formed and the third anchor 153c is formed in perpendicular direction with respect to the first anchor 153a and the second anchor 153b. Thus, the first anchor 153a, the second anchor 153b, and the third anchor 153c together have a U-shape.

Figure 7C:
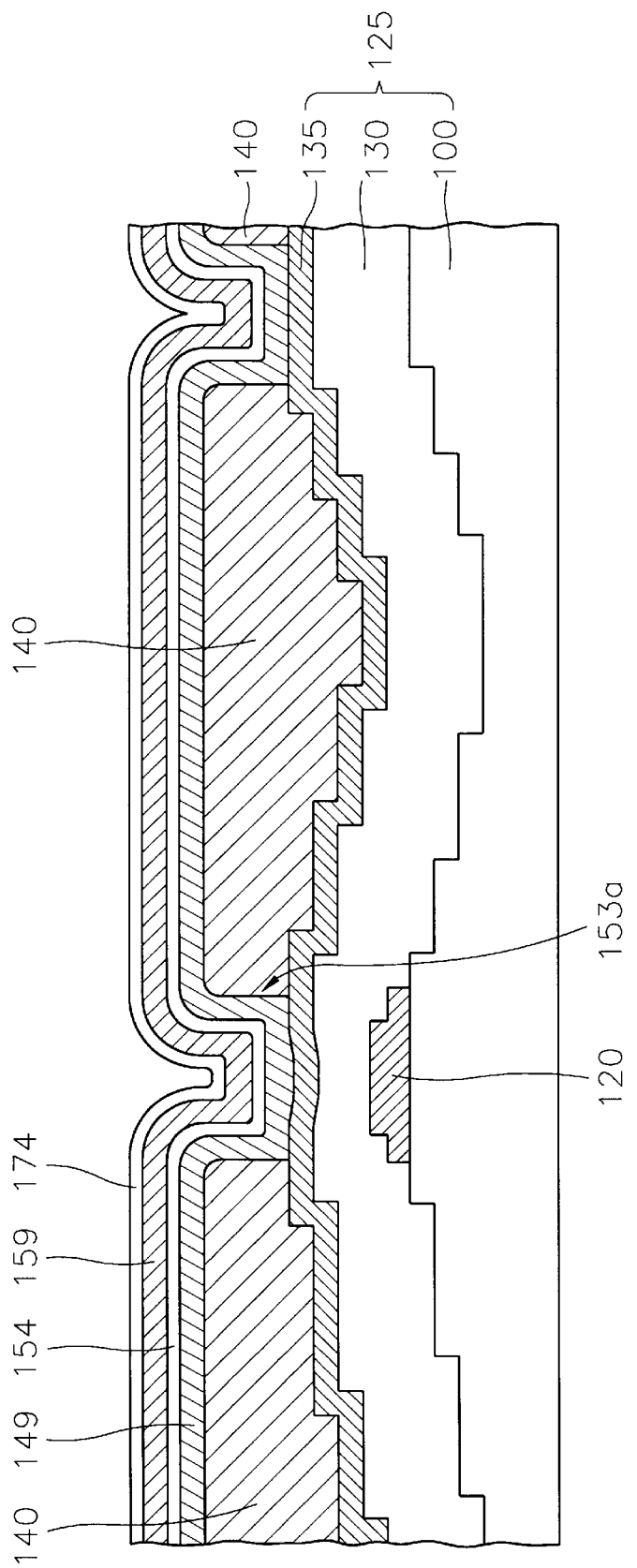

Referring to FIG. 7C, a first layer 149 is formed on the exposed portions of the etch stop layer 135 and on the first sacrificial layer 140. The first layer 149 is formed by using a rigid material, for example, a nitride or a metal. The first layer 149 is formed by an LPCVD method so that the first layer 149 has a thickness of between about 0.1 μm and 1.0 μm. The first layer 149 will be patterned so as to form the first supporting layer 150a, the second supporting layer 150b, and the third supporting layer 150c.

A bottom electrode layer 154 is formed on the first layer 149. The bottom electrode layer 154 is formed by using an electrically conductive metal such as platinum (Pt), tantalum (Ta), or platinum-tantalum (Pt—Ta). The bottom electrode layer 154 is formed by a sputtering method or a CVD method so that the bottom electrode layer 154 has a thickness of between about 0.1 μm and 1.0 μm. The bottom electrode layer 154 will be patterned so as to form the first bottom electrode 155a, the second bottom electrode 155b, and the third bottom electrode 155c.

A second layer 159 is formed on the bottom electrode layer 154. The second layer 159 is formed by using a piezoelectric material such as a PZT (Pb(Zr, Ti)O$_3$) or a PLZT ((Pb, La) (Zr, Ti)O$_3$) so that the second layer 159 has a thickness of between about 0.1 μm and 1.0 μm. Also, the second layer 159 is formed by using an electrostrictive material such as a PMN (Pb(Mg, Nb)O$_3$). The second layer 159 is formed by a sputtering method or a CVD method. Preferably, the second layer 159 is formed by a sputtering method and by using a PZT produced by a sol-gel method so that the second layer 159 has a thickness of about 0.4 μm. Subsequently, the second layer 159 is annealed by a rapid thermal annealing (RTA) method in order to achieve phase transition of the piezoelectric material. The second layer 159 will be patterned so as to form the first active layer 160a, the second active layer 160b, and the third active layer 160c.

A top electrode layer 174 is formed on the second layer 159. The top electrode layer 174 is formed by using an electrically conductive metal, for example, platinum, tantalum, or platinumtantalum. The top electrode layer 174 is formed by a sputtering method or a CVD method so that the top electrode layer 174 has a thickness of between about 0.1 μm and 1.0 μm. The top electrode layer 174 will be patterned so as to form the first top electrode 175a, the second top electrode 175b, and the third top electrode 175c.

Figure 7D:
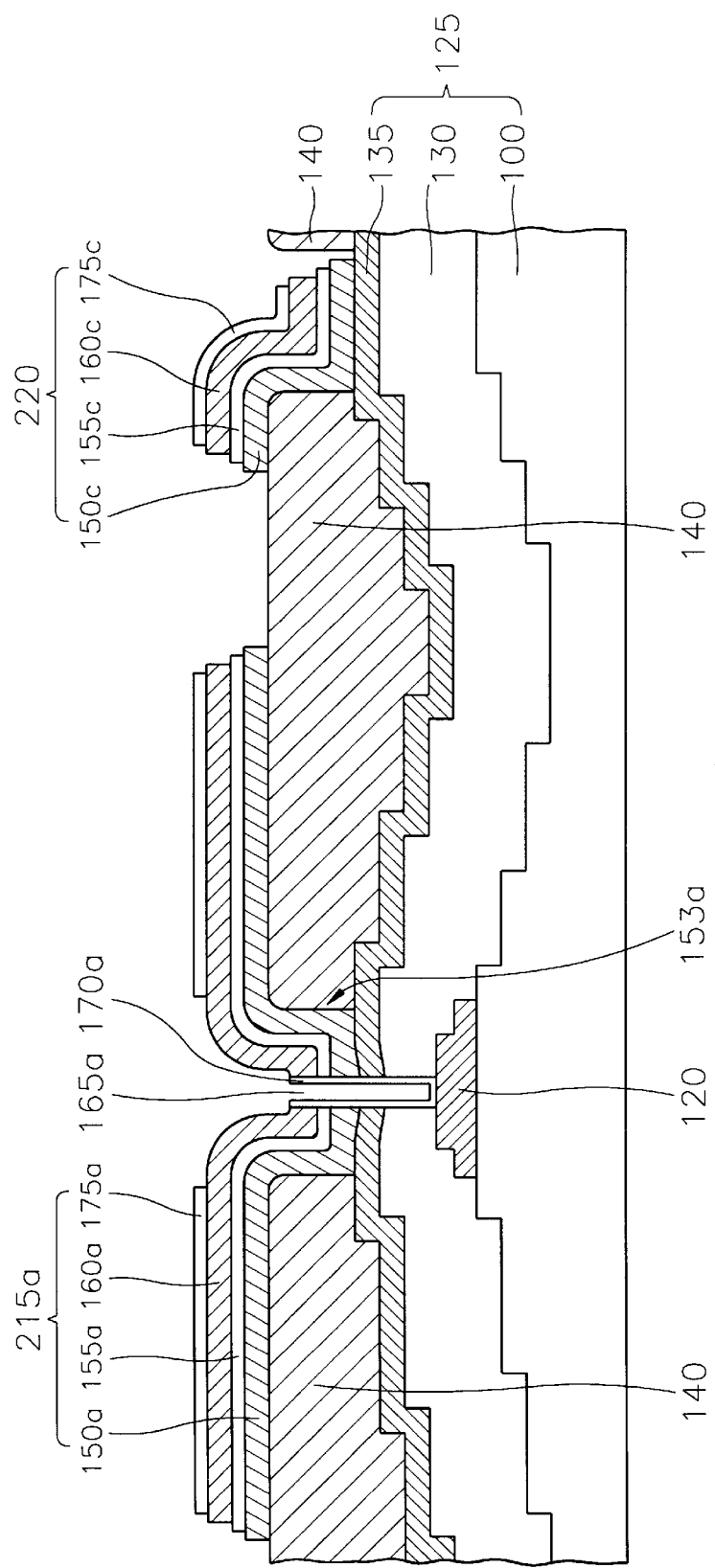

Referring to FIG. 7D, after a first photo resist (not shown) is coated on the top electrode layer 174 by a spin coating method, the top electrode layer 174 is patterned so as to form the first top electrode 175a, the second top electrode 175b, and the third top electrode 175c by using the first photo resist as an etching mask. As a result, the first top electrode 175a and the second top electrode 175b are parallely formed and the third top electrode 175c is formed in perpendicular direction with respect to the first top electrode 175a and the second top electrode 175b. In this case, the first top electrode 175a is divided into two parts centering around the first anchor 153a formed thereunder, as shown in FIG. 5. The second top electrode 175b is also divided into two parts centering around the second anchor 153b formed thereunder.

A second signal, that is, a bias current signal, is applied to the first top electrode 175a for generating a first electric field between the first top electrode 175a and the first bottom electrode 155a. Also, the second signal is applied to the second top electrode 175b for generating a second electric field between the second top electrode 175b and the second bottom electrode 155b. Successively, a second photo resist (not shown) is coated on the first top electrode 175a, on the second top electrode 175b, on the third top electrode 175c, and on the second layer 159 by a spin coating method after the first photo resist is removed by etching. The second layer 159 is patterned so as to form the first active layer 160a, the second active layer 160b, and the third active layer 160c by using the second photo resist as an etching mask. The first active layer 160a, the second active layer 160b, and the third active layer 160c are respectively wider than those of the first top electrode 175a, the second top electrode 175b, and the third top electrode 175c.

Subsequently, a first via hole 165a is formed by etching from the central portion of the first active layer 160a to the connecting terminal 120 through the bottom electrode layer 154, the first layer 149, the etch stop layer 135, and the passivation layer 130, as shown in FIG. 5. At the same time, a second via hole 165b is formed by etching from the central portion of the second active layer 160b to the connecting terminal 120 through the bottom electrode layer 154, the first layer 149, the etch stop layer 135, and the passivation layer 130. Then, a first via contact 170a and a second via contact 170*b* are respectively formed in the first via hole 165*a* and the second via hole 165*b*. The first via contact 170*a* and the second via contact 170*b* are formed by using an electrically conductive metal such as tungsten, platinum, or tantalum and by a sputtering method or a CVD method. The first via contact 170*a* connects the connecting terminal 120 to the first bottom electrode 155*a*, and the second via contact 170*b* connects the connecting terminal 120 to the second bottom electrode 155*b*. So, the first signal is applied to the first bottom electrode 155*a* from outside through the electrical wiring, the connecting terminal 120, and the first via contact 170*a*, and the first signal is also applied to the second bottom electrode 155*b* from outside through the electrical wiring, the connecting terminal, 120 and the second via contact 170*a*.

A third photo resist (not shown) is coated on the first top electrode 175*a*, on the second top electrode 175*b*, on the third top electrode 175*c*, on the first active layer 160*a*, on the second active layer 160*b*, on the third active layer 160*c*, and on the bottom electrode layer 154 by a spin coating method after the second photo resist is removed by etching. The bottom electrode layer 154 is patterned so as to form the first bottom electrode 155*a*, the second bottom electrode 155*b*, and the third bottom electrode 155*c* by using the third photo resist as an etching mask. The first bottom electrode 155*a*, the second bottom electrode 155*b*, and the third bottom electrode 155*c* are respectively wider than the first active layer 160*a*, the second active layer 160*b*, and the third active layer 160*c*. Then, the third photo resist is removed by etching. Hence, when the first signal is applied to the first bottom electrode 155*a* and the second signal is applied to the first top electrode 175*a*, the first electric field is generated between the first top electrode 175*a* and the first bottom electrode 155*a*, so the first active layer 160*a* is deformed by the first electric field. At the same time, when the first signal is applied to the second bottom electrode 155*b* and the second signal is applied to the second top electrode 175*b*, the second electric field is generated between the second top electrode 175*b* and the second bottom electrode 155*b*, so the second active layer 160*b* is deformed by the second electric field.

The first layer 149 is patterned so as to form the first supporting layer 150*a*, the second supporting layer 150*b*, and the third supporting layer 150*c* by using a fourth photo resist (not shown) as an etching mask after the fourth photo resist is coated on the first bottom electrode 155*a*, on the second bottom electrode 155*b*, and on the third bottom electrode 155*c*, by a spin coating method. The bottom of the central portion of the first supporting layer 150*a* is attached to the first portion of the etch stop later 135, the bottom of the central portion of the second supporting layer 150*b* is attached to the second portion of the etch stop later 135, and the bottom of the third supporting layer 150*c* is attached to the third portion of the etch stop later 135. The attached portions of the first supporting layer 150*a*, the second supporting layer 150*b*, and the third supporting layer 150*c* are respectively called the first anchor 153*a*, the second anchor 153*a*, and the third anchor 153*c*. Then, the fourth photo resist is removed by etching. As a result, the first actuator 215*a*, the second actuator 215*b*, and the supporting element 220 are semi-finished.

Figure 7E:
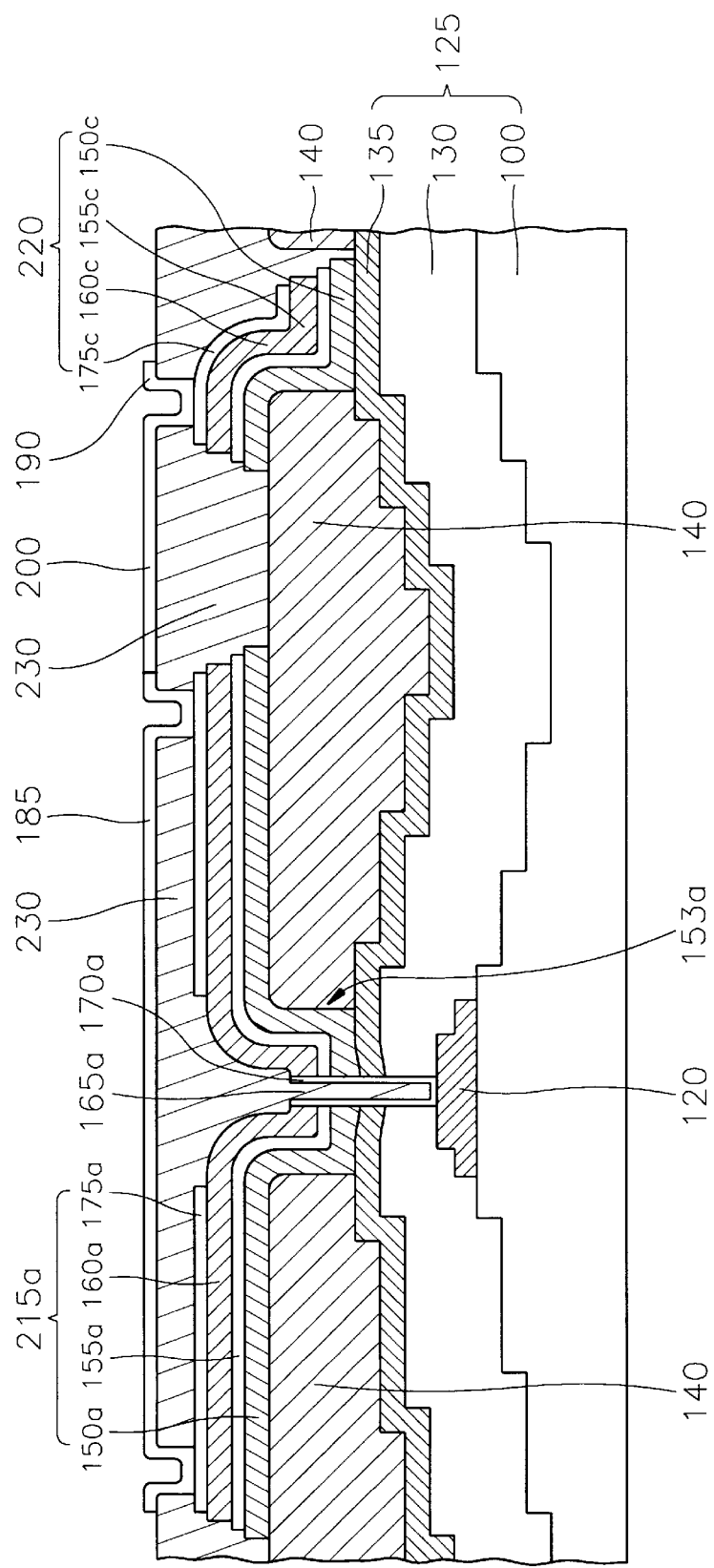

Referring to FIG. 7E, a second sacrificial layer 230 is formed on the first actuator 215*a*, on the second actuator 215*b*, on the supporting element 220, and on the first sacrificial layer 140. The second sacrificial layer 230 is formed by using a spin on polymer or a photo resist and by a spin coating method. Subsequently, the second sacrificial layer 230 is patterned in order to expose the lateral portions of the first top electrode 175*a*, the lateral portions of the second top electrode 175*b*, and the third top electrode 175*c*. Then, a reflective metal layer such as nickel, aluminum, platinum, or silver, is formed on the lateral portions of the first top electrode 175*a*, on the lateral portions of the second top electrode 175*b*, on the third top electrode 175*c*, and on the second sacrificial layer 230. The reflective layer is formed by a sputtering method or a CVD method and has a thickness of between about 0.1 $\mu$m and 1.0 $\mu$m. The first post 180, the second post 185, the third post 190, and the reflecting member 200 are formed after the reflective metal layer is patterned. At that time, bottoms of the lateral portions of the first post 180 are attached to the lateral portions of the first top electrode 175*a*, and bottoms of the lateral portions of the second post 185 are attached to the lateral portions of the second top electrode 175*b*. A second air gap 195*a* is interposed between the central portion of the first post 180 and the first top electrode 175*a* after the second sacrificial layer 230 is removed by etching. Also, a third air gap 195*b* is interposed between the central portion of the second post 185 and the second top electrode 175*b* after the second sacrificial layer 230 is removed. Thus, the central portion of the first post 180 is horizontally protruded above the first top electrode 175*a*, and the central portion of the second post 185 is horizontally protruded above the second top electrode 175*b*. The portions of the central portions of the first post 180 and the second post 185 are prolonged toward each other, so the first post 180 and the second post 185 together have an H-shape. The bottom of the third post 190 is attached to the third top electrode 175*c*. The attached portions of the first post 180, the second post 185, and the third post 190 respectively have U-shapes. The reflecting member 200 is formed on the second sacrificial layer 230 from the prolonged portions of the first post 180 and the second post 185 to the third post 190. The reflecting member 200 has a rectangular shape. Thus, the first post 180, the second post 185, and the third post 190 together support the reflecting member 200.

Successively, the second sacrificial layer 230 is removed by using oxygen plasma and the first sacrificial layer 140 is removed by using a vapor of hydrogen fluoride (HF). As a result, the first actuator 215*a*, the second actuator 215*b*, and the supporting element 220 are completed. When the first sacrificial layer 140 is removed, the first air gap 145 is formed at where the first sacrificial layer 140 is positioned. Then, the thin film actuated mirror array as shown in FIG. 5 is completed after a rinsing step and a drying step are performed.

The operation of the thin film AMA in an optical projection system according to the present invention will be described.

Figure 8:
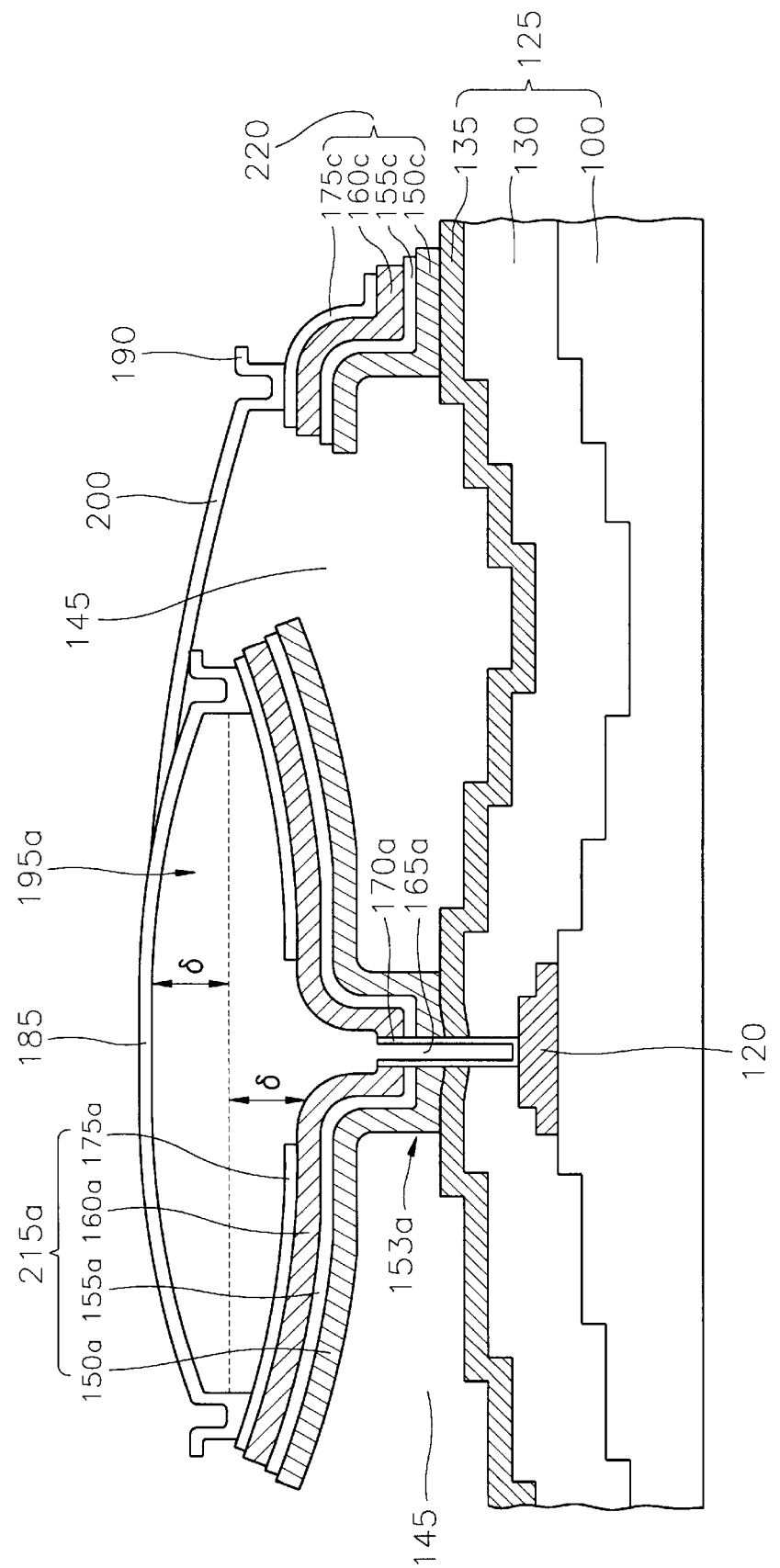
FIG. 8 is a cross-sectional view for illustrating the operation of the thin film actuated mirror array in an optical projection system according to the present invention.

In the thin film AMA according to the present invention, the first signal is applied to the first bottom electrode 155*a* from outside through the electrical wiring, the connecting terminal 120, and the first via contact 170*a*. Also, the first signal is applied to the second bottom electrode 155*b* from outside through the electrical wiring, the connecting terminal 120, and the second via contact 170*b*. At the same time, the second signal is applied to the first top electrode 175*a* and to the second top electrode 175*b* from outside through a common line (not shown). As a result, the first electric field is generated between the first top electrode 175*a* and the first bottom electrode 155*a* and the second electric field is generated between the second top electrode 175*b* and the second bottom electrode 155*b*. The first active layer 160*a* formed between the first top electrode 175*a* and the first bottom electrode 155a is deformed by the first electric field, and the second active layer 160b formed between the second top electrode 175b and the second bottom electrode 155b is deformed by the second electric field. The first active layer 160a and the second active layer 160b are respectively deformed in the direction perpendicular to the first electric field and the second electric field. The first actuator 215a having the first active layer 160a is actuated in the opponent direction to the direction in which the first supporting layer 150a is positioned, and the second actuator 215b having the second active layer 160b is actuated in the opponent direction to the direction in which the second supporting layer 150b is positioned. FIG. 8 is a cross-sectional view for illustrating the operation of the first actuator 215a according to the present invention. Referring to FIG. 8, the lateral portions of the first actuator 215a are respectively actuated upward centering around the first anchor 153a. When the lateral portions of the first actuator 215a are actuated, the first post 180 formed on the first actuator 215a is also bent upward by means of a metal tension strip interaction between the first actuator 215a and the first post 180. In this case, when the displacement of the first actuator 215a is δ, the first post 180 has the same displacement as that of the first actuator 215a. That is, the displacement of the first post 180 is δ. Also, the lateral portions of the second actuator 215b are respectively actuated upward centering around the second anchor 153b. When the lateral portions of the second actuator 215b are actuated, the second post 185 formed on the second actuator 215b is also bent upward by means of the metal tension strip interaction between the second actuator 215b and the second post 185. When the displacement of the second actuator 215b is δ, the second post 185 has the same displacement as that of the second actuator 215b. Therefore, the sum of the displacements of the actuators and the posts is 2δ. Thus, the reflecting member 200 which is supported by the first post 180 and the second post 185 is tilted by a displacement of 2δ. Hence, the reflecting member 200 reflects the light onto a screen, so the picture is formed on the screen.

In the conventional thin film AMA, the amount of the light reflected by the reflecting member is smaller than that of the light incidented to the thin film AMA considering the area of the thin film AMA, because a supporting portion of the reflecting member is larger than a reflecting portion of the reflecting member. That is, because the supporting portion of the reflecting member which supports during the tilting of the reflecting member according to the tilting of the actuator is larger than the reflecting portion of the reflecting member which actually reflects the incident light, the light efficiency is decreased with respect to the area of the thin film AMA, so the quality of picture projected onto the screen by the thin film AMA is decreased. In addition, the incident light is scattered at a position of supporting portion of the reflecting member which is adjacent to the reflecting portion of the reflecting member because the incident light is also reflected at the position of supporting portion. Hence, the quality of a picture projected onto the screen by the thin film AMA is also decreased.

However, in the thin film actuated mirror array in an optical projection system according to the present invention, the thin film AMA has a first actuator, a second actuator, a supporting element, and a reflecting member. The first actuator and the second actuator are respectively actuated by a predetermined displacement. A first post, a second post, and a third post are respectively formed on the first actuator, the second actuator, and the supporting element. The first post and the second post which are respectively bent by a predetermined displacement by mean of the metal tension strip interaction between the posts and the actuators. The reflecting member supported by the first post and the second post is tilted by a twice displacement, so the quality of a picture projected onto a screen is greatly increased. Also, the first actuator and the second actuator respectively have symmetrical structures centering around the first anchor and the second anchor so that the first actuator and the second actuator have stable structures. In addition, the reflecting member is supported by the first post, the second post, and the third post so as to increase the flatness of the reflecting member.

Although the preferred embodiment of the present invention has been described, it is understood that the present invention should not be limited to this preferred embodiment, but various changes and modifications can be made by one skilled in the art within the spirit and scope of the invention as hereinafter claimed.

What is claimed is:

1. A thin film actuated mirror array comprising:
   an active matrix having electrical wiring and a connecting terminal for receiving a first signal from outside and transmitting the first signal;
   a first actuator having i) a first supporting layer having a bottom of a central portion attached to a first portion of said active matrix where the connecting terminal is formed and having lateral portions formed in parallel to and above said active matrix, ii) a first bottom electrode for receiving the first signal, said first bottom electrode being formed on said first supporting layer, iii) a first top electrode corresponding to said first bottom electrode for receiving a second signal and generating a first electric field between said first top electrode and said first bottom electrode, iv) a first active layer formed between said first top electrode and said first bottom electrode and deformed by the first electric field, and v) a first post having lateral ends respectively attached to said first top electrode and a central portion formed above said first top electrode;
   a second actuator having a) a second supporting layer having a bottom of a central portion attached to a second portion of said active matrix where the connecting terminal is formed and having lateral portions formed in parallel to and above said active matrix, b) a second bottom electrode for receiving the first signal, said second bottom electrode being formed on said second supporting layer, c) a second top electrode corresponding to said second bottom electrode for receiving the second signal and generating a second electric field between said second top electrode and said second bottom electrode, d) a second active layer formed between said second top electrode and said second bottom electrode and deformed by the second electric field, and a second post having lateral ends respectively attached to said second top electrode and e) a central portion formed above said second top electrode;
   a supporting means formed on a third portion of said active matrix; and
   a reflecting means for reflecting a light, said reflecting means being formed on said first post, on said second post, and on said supporting means, so that the reflecting means tilts upward by a metal tension strip reaction between said first and second actuators and said first and second posts, respectively.

2. The thin film actuated mirror array as claimed in claim 1, said active matrix further comprising a passivation layer for protecting said active matrix and an etch stop layer for preventing said active matrix from etching.

3. The thin film actuated mirror array as claimed in claim 1, wherein said first actuator is formed in parallel to said second actuator and the supporting means faces said first actuator and said second actuator, so that said actuators and the supporting means form together a schematic U-shape.

4. The thin film actuated mirror array as claimed in claim 1, said supporting means further comprising a third supporting layer formed on the third portion of said active matrix, a third bottom electrode formed on said third supporting layer, a third active layer formed on said third bottom electrode, a third top electrode formed on said third active layer, and a third post formed on said third top electrode.

5. The thin film actuated mirror array as claimed in claim 1, wherein said first post and said second post are extended toward each other so that said first post and said second post together have an H-shape.

6. The thin film actuated mirror array as claimed in claim 5, wherein said reflecting means is formed from the extended portions of said first post and said second post to said third post, and has a rectangular shape.

7. The thin film actuated mirror array as claimed in claim 1, wherein said first top electrode has a first part and a second part respectively formed on said first active layer, and said second top electrode has a first part and a second part respectively formed on said second active layer.

8. The thin film actuated mirror array as claimed in claim 7, said first actuator further comprising a first via contact for transmitting the first signal from the connecting terminal to said first bottom electrode, said first via contact being formed in a first via hole which is formed from a central portion of said first active layer to the connecting terminal through said first bottom electrode and said first supporting layer, and said second actuator further comprising a second via contact for transmitting the first signal from the connecting terminal to said second bottom electrode, said second via contact being formed in a second via hole which is formed from a central portion of said second active layer to said connecting terminal through said second bottom electrode and said second supporting layer.

9. A thin film actuated mirror array comprising:

an active matrix having electrical wiring and a connecting terminal for receiving a first signal from outside and transmitting the first signal;

a first actuator having i) a first supporting layer having a bottom of a central portion attached to a first portion of said active matrix where the connecting terminal is formed and having lateral portions formed in parallel to and above said active matrix, ii) a first bottom electrode for receiving the first signal, said first bottom electrode being formed on said first supporting layer, iii) a first top electrode corresponding to said first bottom electrode for receiving a second signal and generating a first electric field between said first top electrode and said first bottom electrode, iv) a first active layer formed between said first top electrode and said first bottom electrode and deformed by the first electric field, and v) a first post having lateral ends respectively attached to said first top electrode and a central portion formed above said first top electrode;

a second actuator having a) a second supporting layer having a bottom of a central portion attached to a second portion of said active matrix where the connecting terminal is formed and having lateral portions formed in parallel to and above said active matrix, b) a second bottom electrode for receiving the first signal, said second bottom electrode being formed on said second supporting layer, c) a second top electrode corresponding to said second bottom electrode for receiving the second signal and generating a second electric field between said second top electrode and said second bottom electrode, d) a second active layer formed between said second top electrode and said second bottom electrode and deformed by the second electric field, and e) a second post having lateral ends respectively attached to said second top electrode and a central portion formed above said second top electrode, said second actuator being formed in parallel to said first actuator;

a supporting means formed on a third portion of said active matrix and facing said first actuator and said second actuator, so that said supporting means and said actuators form together a schematic U-shape, said supporting means having a third supporting layer formed on the third portion of said active matrix, a third bottom electrode formed on said third supporting layer, a third active layer formed on said third bottom electrode, a third top electrode formed on said third active layer, and a third post formed on said third top electrode; and a reflecting means for reflecting a light, said reflecting means being formed on said first post, on said second post, and on said third post so that the reflecting means tilts upward by a metal tension strip reaction between said first and second actuators and said first and second posts, respectively.

10. The thin film actuated mirror array as claimed in claim 9, wherein said first post and said second post are extended toward each other so that said first post and said second post together have an H-shaped.

11. The thin film actuated mirror array as claimed in claim 10, wherein said reflecting means is formed from the extended portions of said first post and said second post to said third post, and has a rectangular shape.

12. The thin film actuated mirror array as claimed in claim 9, wherein said first top electrode has a first part and a second part respectively formed on said first active layer, said second top electrode has a first part and a second part respectively formed on said second active layer.

13. The thin film actuated mirror array as claimed in claim 12, said first actuator further comprising a first via contact for transmitting the first signal from the connecting terminal to said first bottom electrode, said first via contact being formed in a first via hole which is formed from a central portion of said first active layer to the connecting terminal through said first bottom electrode and said first supporting layer, and said second actuator further comprising a second via contact for transmitting the first signal from the connecting terminal to said second bottom electrode, said second via contact being formed in a second via hole which is formed from a central portion of said second active layer to said connecting terminal through said second bottom electrode and said second supporting layer.

14. A method for manufacturing a thin film actuated mirror array comprising the steps of:

providing an active matrix having electrical wiring and a connecting terminal for receiving a first signal from outside and transmitting the first signal;

forming a first sacrificial layer on said matrix;

patterning said first sacrificial layer to expose a first portion and a second portion of said active matrix where the connecting terminal is formed, and to expose a third portion of said active matrix in perpendicular direction to the first exposed portion and the second exposed portion;

forming a first layer, a bottom electrode layer, a second layer, and a top electrode layer on the exposed portions of said active matrix and on the first sacrificial layer;

forming a first actuator and a second actuator in parallel by patterning said top electrode layer to form a first top electrode and a second top electrode for respectively receiving a second signal and respectively generating a first electric field and a second electric field, by patterning said second layer to form a first active layer and a second active layer respectively deformed by the first electric field and the second electric field, by patterning said bottom electrode layer to form a first bottom electrode and a second bottom electrode for respectively receiving the first signal, and by patterning said first layer to form a first supporting layer having a central portion attached to the first exposed portion of said active matrix and lateral portions formed on said first sacrificial layer, and to form a second supporting layer having a central portion attached to the second exposed portion of said active matrix and lateral portions formed on said first sacrificial layer;

forming a supporting means by patterning said top electrode layer to form a third top electrode, by patterning said second layer to form a third active layer, by patterning said bottom electrode layer to form a third bottom electrode, and by patterning said first layer to form a third supporting layer attached to the third exposed portion of said active matrix;

forming a second sacrificial layer on said first actuator, on said second actuator, and on said supporting means;

patterning the second sacrificial layer to expose lateral portions of said first top electrode, lateral portions of said second top electrode, and a portion of said third top electrode;

forming a reflective metal on the exposed portion of said first top electrode, said second top electrode, and said third top electrode, and on the second sacrificial layer;

forming a first post on said first top electrode, forming a second post on said second top electrode, forming a third post on said third top electrode; and forming a reflecting means by patterning the reflective metal.

15. The method for manufacturing the thin film actuated mirror array as claimed in claim 14, the step of forming said first actuator further comprising forming a first via hole from a central portion of said first active layer to the connecting terminal and forming a first via contact for connecting said first bottom electrode and the connecting terminal in the first via hole, and the step of forming said second actuator further comprising forming a second via hole from a central portion of said second active layer to the connecting terminal and forming a second via contact for connecting said second bottom electrode and the connecting terminal in the second via hole.

16. The method for manufacturing the thin film actuated mirror array as claimed in claim 14, wherein the step of forming the second sacrificial layer is performed by using a spin on polymer or photoresist.

17. The method for manufacturing the thin film actuated mirror array as claimed in claim 14, the step of forming said reflecting means further comprising removing the second sacrificial layer by using oxygen plasma and removing the first sacrificial layer by using a vapor of hydrogen fluoride.

* * * * *